(12) United States Patent
Toyota

(10) Patent No.: US 9,194,489 B2
(45) Date of Patent: Nov. 24, 2015

(54) SHIFT CONTROL DEVICE FOR AUTOMATIC TRANSMISSION

(75) Inventor: Ryohey Toyota, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 118 days.

(21) Appl. No.: 14/003,468

(22) PCT Filed: Feb. 15, 2012

(86) PCT No.: PCT/JP2012/053448
§ 371 (c)(1),
(2), (4) Date: Sep. 6, 2013

(87) PCT Pub. No.: WO2012/172828
PCT Pub. Date: Dec. 20, 2012

(65) Prior Publication Data
US 2014/0088845 A1     Mar. 27, 2014

(30) Foreign Application Priority Data
Jun. 17, 2011     (JP) ................................. 2011-135534

(51) Int. Cl.
*F16H 61/68*     (2006.01)
*F16H 61/08*     (2006.01)
(Continued)

(52) U.S. Cl.
CPC ................ *F16H 61/68* (2013.01); *F16D 25/06* (2013.01); *F16H 61/08* (2013.01); *F16H 61/688* (2013.01)

(58) Field of Classification Search
CPC ........ F16H 61/688; F16H 61/68; F16D 25/06
USPC ..................................................... 701/51, 60
See application file for complete search history.

(56) References Cited

U.S. PATENT DOCUMENTS 5,910,175 A * 6/1999 Malson ........................... 701/57
6,427,551 B2 * 8/2002 Iizuka et al. ..................... 74/359
(Continued)

FOREIGN PATENT DOCUMENTS

| CN | 1668640 A | 10/2005 |
| CN | 1688460 A | 10/2005 |

(Continued)

OTHER PUBLICATIONS

The Chinese Office Action for the corresponding Chinese Application No. 201280022355.X issued on Dec. 15, 2014.
(Continued)

*Primary Examiner* — James Trammell
*Assistant Examiner* — Majdi Alsomiri
(74) *Attorney, Agent, or Firm* — Global IP Counselors, LLP

(57) ABSTRACT

An automatic transmission shift control device include a controller that is programmed to shift an automatic transmission by issuing a command for switching an interference shift element from an engaged state to a disengaged state, and by issuing a command for switching a friction shift element from a released state to a locked state. The controller includes a progressive friction-shift-element switchover section which causes progressive switching of the friction shift element from the released state to the locked state prior to the command for switching of the interference shift element from the engaged state to the disengaged state. The controller includes an interference-shift-element switchover section which causes the switching of the interference shift element from the engaged state to the disengaged state when transmission torque of the interference shift element decreases to a predetermined value as the friction shift element progressively switches from the released state to the locked state.

15 Claims, 7 Drawing Sheets

(51) Int. Cl.
*F16D 25/06* (2006.01)
*F16H 61/688* (2006.01)

(56) References Cited

U.S. PATENT DOCUMENTS

| | | | |
|---|---|---|---|
| 7,559,873 B2 * | 7/2009 | Thor et al. | 477/79 |
| 7,985,163 B2 * | 7/2011 | Jiang | 477/180 |
| 2002/0066328 A1 | 6/2002 | Ochi et al. | |
| 2002/0144562 A1 * | 10/2002 | Forsyth | 74/329 |
| 2002/0144563 A1 * | 10/2002 | Forsyth | 74/333 |
| 2004/0110012 A1 | 6/2004 | Bier et al. | |
| 2010/0248896 A1 * | 9/2010 | Dreier | 477/118 |

FOREIGN PATENT DOCUMENTS

| | | |
|---|---|---|
| JP | 2004-84912 A | 3/2004 |
| JP | 2006-90347 A | 4/2006 |
| JP | 2007-46659 A | 2/2007 |
| JP | 2010-188795 A | 9/2010 |
| JP | 2010-280262 A | 12/2010 |
| JP | 2011-17351 A | 1/2011 |

OTHER PUBLICATIONS

The Decision on Grant for the corresponding Russian Application No. 2014101295/11(001771), issued on Mar. 25, 2015, including an English Translation.

* cited by examiner

SHIFT CONTROL DEVICE FOR AUTOMATIC TRANSMISSION

CROSS-REFERENCE TO RELATED APPLICATIONS

This application is a U.S. National stage application of International Application No. PCT/JP2012/053448, filed Feb. 15, 2012, which claims priority claims priority under to Japanese Patent Application No. 2011-135534, filed in Japan on Jun. 17, 2011.

BACKGROUND

1. Field of the Invention

The present invention relates to a shift control device for an automatic transmission. More specifically, the present invention relates to techniques for improving the shift quality by the so-called shift elements wherein an interference shift element such as a dog clutch is switched from an engaged state to a disengaged state while a friction shift element such as a friction clutch or a friction brake is switched from a released state to a locked state.

2. Background Information

For example, one of the existing automatic transmissions proposed is the automatic transmission described in Japanese Unexamined Patent Publication No. 2010-188795, which is an automatic transmission that shifts gears by switching the interference shift element such as a dog clutch from the engaged state to the disengaged state, and by switching the friction shift element such as a friction clutch or a friction brake from the released state to the locked state.

The automatic transmission system used in the motor transmission system for a hybrid vehicle selects and uses either a high speed transmission system that transmits the rotations of the electric motor at high speed, or a low speed transmission system that transmits the rotations of the electric motor at low speed. In short, placing the dog clutch in the engaged state and the friction clutch in the released state thereby allows selection of the low speed transmission system, and placing the dog clutch in the disengaged state and the friction clutch in the locked state allows selection of the high speed transmission system.

In the case of this kind of automatic transmission, when switching (shifting) from the state of using the low speed transmission system to the state of using the high speed transmission system, the shifting (upshift) involves switching the dog clutch from the engaged state to the disengaged state, and switching the friction clutch from the released state to the locked state.

In the automatic transmission described in Japanese Unexamined Patent Publication No. 2010-188795, when shifting, the shifting (upshift) is performed by first, switching the dog clutch from the engaged state to the disengaged state, and thereafter switching the friction clutch from the released state to the locked state.

SUMMARY

Thus, in this manner, first switching the dog clutch to the disengaged state, and then switching the friction clutch to a locked state results in a time when both the dog clutch and the friction clutch cannot transmit power, and during this period the automatic transmission is in a neutral state (neutral position).

In addition to causing the drive torque to temporarily drop to zero, which results in the feeling of deceleration, the temporary neutral state (neutral position) of the automatic transmission causes an increase in the input rotation speed to the automatic transmission (rotation speed of the electric motor), leading to a shift shock caused by the change in input rotations, and in any case resulting in reducing the shift quality.

To address the above mentioned problems and realize improvement in shift quality, the present invention aims provide a shift control device for an automatic transmission capable of performing shift control so that the above mentioned neutral state (neutral position) does not occur even when switching the interference shift element from the engaged state to the disengaged state and switching the friction shift element from the released state to the locked state.

For this purpose, the shift control device for an automatic transmission according to the present invention has the following configuration. First, in the automatic transmission as premised in the present invention, shifting is possible by switching the interference shift element from the engaged state to the disengaged state and switching the friction shift element from the released state to the locked state.

The present invention is characterized in having an automatic transmission configured with the progressive friction-shift-element switchover means, and an interference-shift-element switchover means.

The former progressive friction-shift-element switchover means causes progressive switching of the above mentioned friction shift element from the released state to the locked state prior to the switching of the interference shift element from the engaged state to the disengaged state.

Further, the latter interference-shift-element switchover means causes the switching of the above mentioned interference shift element from the engaged state to the disengaged state when the transmission torque for the interference shift element decreases to a predetermined value as the above mentioned progressive friction-shift-element switchover means causes the switching of the friction shift element from the released state to the locked state.

The shift control device for automatic transmission according to the present invention causes the progressive switch of the friction shift element from the released state to the locked state prior to the switching of the interference shift element from the engaged state to the disengaged state; and as the friction shift element is progressively switching from the released state to the locked state, the shift control device causes the switch of the interference shift element from the engaged state to the disengaged state when the transmission torque of the interference shift element has decreased to a predetermined value to thereby execute the above mentioned shifting. Therefore the shift control device for automatic transmission according to the present invention has the following effects.

That is, there is no time when both the interference shift element and the friction shift element cannot transmit power; therefore, while shifting, the automatic transmission does not enter a neutral state (neutral position) where power transmission impossible. Accordingly, while shifting there is no instance when the drive torque becomes zero, and there is no feeling of deceleration.

For the same reason, the input rotation speed to the automatic transmission does not temporarily increase, and it is possible to avoid the shift shock that would be caused by the change in input rotations.

Hereby, in any case the problems present in the conventional shift control device pertaining to reduced shift quality are addressed by the present invention.

BRIEF DESCRIPTION OF THE DRAWINGS

Referring now to the attached drawings which form a part of this original disclosure.

DETAILED DESCRIPTION OF THE EMBODIMENTS

Embodiments of the invention will be explained below based on the attached drawings.

Embodiment 1

Figure 1:
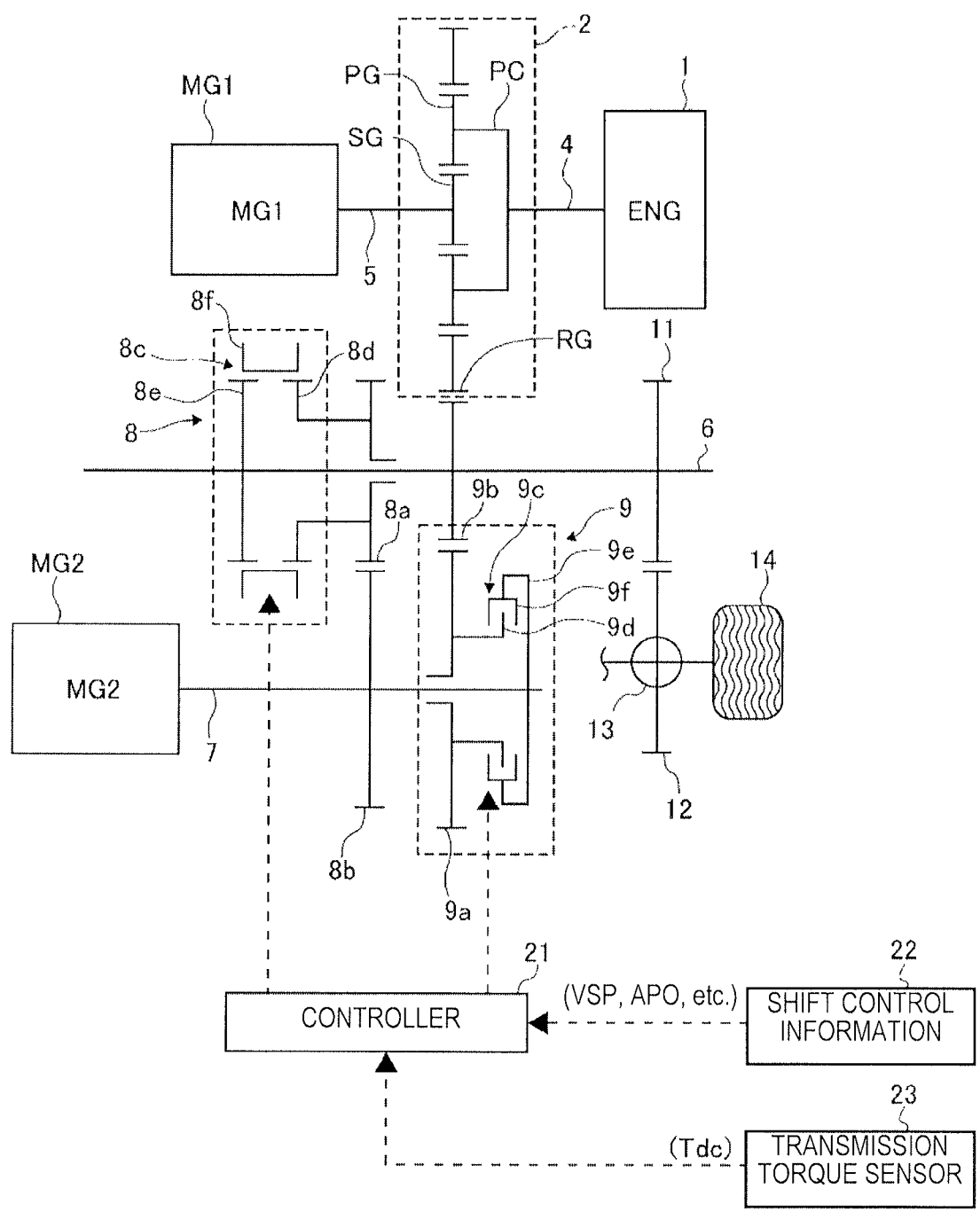
FIG. 1 is a simplified line graphic illustrating a drive device for a hybrid vehicle containing an automatic transmission equipped with a shift control device according to a first embodiment of the present invention, together with the shift control system in the automatic transmission.

FIG. 1 is a simplified line graphic illustrating the drive device for a hybrid vehicle containing an automatic transmission equipped with a shift control device according to the first embodiment of the present invention; the drive device has the configuration described below.

An engine 1 (ENG) which is an internal combustion engine, a first motor-generator MG1 which is used primarily as a generator, and a second motor-generator MG2 which is used as the electric motor are provided to serve as the source of power for the drive device. The engine 1 and the first motor-generator MG1 are placed facing each other on the same shaft, with a power transfer device 2 placed on the same shaft interposed between the engine 1 and the first motor-generator MG1.

The power transfer device 2 is a simple planetary gear set comprising a central sun gear SG, a ring gear RG that is concentric with and surrounds the sun gear SG, a plurality of pinions PG which engages with the sun gear SG and the ring gear RG, and a pinion carrier PC which support the pinions PG to freely rotate.

The output shaft (crank shaft) 4 of the engine 1 is coupled to the pinion carrier PC in the power transfer device 2, and the output shaft 5 of the first motor-generator MG1 is coupled to the sun gear SG in the power transfer device 2.

A first shaft 6 and a second shaft 7 are placed side by side and respectively parallel to the same shaft on which the engine 1, the power transfer device 2, and the motor-generator MG1 are arranged. The second motor-generator MG2, which is used as the electric motor, is coupled to and drives the second shaft 7; below is a description of the automatic transmission used for output of the motor power that passes from the motor-generator MG2 sequentially through the second shaft 7 and the first shaft 6.

In other words, a low side transmission unit 8 for selecting a low side transmission path, and a high side transmission unit 9 for selecting a high side transmission path are arranged and provided on the first shaft 6 and the second shaft 7 respectively to output the above mentioned motor power.

A low-speed gear set comprises a gear 8a supported on the first shaft 6 to rotate freely, and a gear 8b which rotates together with the second shaft 7. The low side transmission unit 8 is constituted by a dog clutch 8c which functions as the interference shift element described below. The low side transmission unit 8 is for rotationally engaging the gear 8a with, and disengaging the gear 8a from, the first shaft 6 in order for the low speed gear set to provide a drive connection between the first shaft 6 and the second shaft 7.

The dog clutch 8c is equipped with a clutch gear 8d provided on the gear 8a, a clutch hub 8e coupled with the first shaft 6, and a coupling sleeve 8f. The dog clutch forms clutch teeth of similar construction as the outer circumference of the clutch gear 8d and the clutch hub 8e.

When the coupling sleeve 8f is in the engagement position shown and engages both the clutch gear 8d and the outer clutch teeth of the clutch hub 8e, the dog clutch 8c couples the gear 8d with the first shaft 6; thereby the dog clutch 8c is in the engaged state wherein the gears 8b, 8a transmit motor power from the motor-generator MG2 and from the second shaft 7 to the first shaft 6 to output the motor power.

When the coupling sleeve 8f is in the disengaged position, that is, when the coupling sleeve 8f is shifted in the shaft direction from the position shown causing either the clutch gear 8d or the outer clutch teeth of the clutch hub 8e to no longer be engaged, the dog clutch separates the gear 8d from the first shaft 6; thereby the dog clutch 8e is in the disengaged state where the gears 8b, 8a cannot transmit motor power from the motor-generator MG2 and from the second shaft 7 to the first shaft 6.

A hydraulic actuator (not shown) may be used for shifting the coupling sleeve 8f in the shaft direction.

A high speed gear set comprises a gear 9a supported on the second shaft 7 to rotate freely, and a gear 9b which rotates together with the first shaft 6. The high side transmission unit 9 is constituted by a friction clutch 9c which functions as the friction shift element described below. The high side transmission unit 9 is for coupling the gear 9a with the second shaft 7 and separating the gear 9a from the second shaft 7 in order for the high speed gear set to provide a drive connection between the first shaft 6 and the second shaft 7. The friction clutch 9c is equipped with a driven clutch disk 9d which rotates together with the gear 9a, a driving clutch disk 9e which rotates together with the second shaft 7, and a hydraulic clutch piston 9f. The friction clutch 9c functions as follows.

When the clutch piston 9f uses hydraulics to bring the clutch disks 9d, 9e in mutual frictional contact, the friction clutch 9c couples the gear 9a to the second shaft 7 and the second shaft 7 drives the gear 9a; thereby the friction clutch is in a locked state wherein the gears 9a, 9b transmit motor power from the motor-generator MG2 and from the second shaft 7 to the first shaft 6 to output the motor power. When the clutch piston 9f does not operate due to the loss of hydraulic fluid pressure and the clutch disks 9d, 9e are not kept in mutual frictional contact, the friction clutch 9c does not allow coupling of the gear 9a to the second shaft 7 and driving of the gear 9a by the second shaft 7; thereby the friction clutch 9c is in a released state wherein the gears 9a, 9b cannot transmit motor power from the motor-generator MG2 and from the second shaft 7 to the first shaft 6.

Moreover, in order for the gear ratio of the gears 9a, 9b to function in the high speed gear set, the gear ratio will of course be set smaller than the gear ratio of the gears 8b, 8a that make up the low speed gear set. A gear is provided at the outer circumference of the ring gear RG that is part of the power transfer device 2. The gear engages with the gear 9b in the high speed gear set, thereby enabling power transfer between the first shaft 6 and the ring gear RG in the power transfer device 2.

A gear 11 is attached to the first shaft 6; the first shaft 6 is coupled to and drives a differential gear device 13 by way of a final drive gear set which is constituted by the gear 11 and a gear 12 engaged with the gear 11. Hereby, the motor power from the motor-generator MG2 that reaches the first shaft 6 travels through the final drive gear set 11, 12 and the differential gear device 13 and is transmitted to the left and right drive wheels 14 (only one of the drive wheels is illustrated in FIG. 1).

The engine 1 drives the motor-generator MG1 by way of the power transfer device 2 and the electric power that the motor-generator MG1 generates is stored in a battery (not shown); and the motor-generator MG2 acquires the electric power in the battery for driving. The motor power from the motor-generator MG2 is transmitted as follows.

If the dog clutch 8c is in the disengaged state wherein the gear 8a is not rotationally engaged with the first shaft 6, the motor power from the motor-generator MG2 cannot be transmitted from the second shaft 7 to the first shaft 6 by way of the gears 8b, 8a. Moreover, if the friction clutch 9c is in the released state wherein the gear 9a cannot be coupled with and driven by the second shaft 7, the motor power from the motor-generator MG2 cannot be transmitted from the second shaft 7 to the first shaft 6 by way of the gears 9a, 9b. Therefore the automatic transmission is in the neutral state where the motor power is not being sent to the drive wheels and it is possible to stop the vehicle.

When the low speed gear is selected, the dog clutch 8c is in the engaged state that causes the gear 8a to be rotationally engaged with the first shaft 6 and the motor power from the motor-generator MG2 to be transmitted from the second shaft 7 to the first shaft 6 by way of the gears 8b, 8a; at that time the motor power to the second shaft 7 passes through the gears 8b, 8a, the dog clutch 8c which is in the engaged state, the first shaft 6, the final drive gear set 11, 12, and the differential gear device 13 to the drive wheels 14. Consequently, the automatic transmission can drive the wheels 14 at a low speed, and cause the vehicle to drive at the low speed.

When the high speed gear is selected, the friction clutch is in the locked state that causes the gear 9a to be coupled with and driven by the second shaft 7 and the motor power from the motor-generator MG2 to be transmitted from the second shaft 7 to the first shaft 6 by way of the gears 9a, 9b; at that time the motor power to the second shaft 7 passes through the gears 9a, 9b, the friction clutch 9c which is in the locked state, the first shaft 6, the final drive gear set 11, 12, and the differential gear device 13 to the drive wheels 14. Consequently, the automatic transmission can drive the wheels 14 at a high speed, and cause the vehicle to drive at the high speed.

Thus, regenerative braking while traveling at the above mentioned low or high speeds applies a generation load to the motor-generator MG1. Hereby, as the motor-generator MG1 is being driven via the power transfer device 2 by the gear 9b which rotates together with the first shaft 6 that is constantly engaged with the wheels 14, the motor-generator MG1 generates the power responsive to the generation load to perform regenerative braking and stores the electric power generated at that time in the aforementioned battery. Moreover, in this manner the motor-generator MG1 may be used not only as a generator, but also as an electric motor that operates to supplement the lack of power when the vehicle is in a driving state where the power from the motor-generator MG2 alone is insufficient. At this time, the engine 1 may also operate to supplement for said lack of power as necessary.

In the above mentioned automatic transmission, upshifting from a low speed selection state to a high speed selection state is carried out by switching the dog clutch 8c from the engaged state to the disengaged state, and switching the friction clutch 9c from the released state to the locked state. In other words, the shifting in question is carried out by interchanging both of the clutches 8c, 9c.

Thus, when performing the relevant shifting, switching the dog clutch 8c from the engaged state to the disengaged state first, and then switching the friction clutch 9c from a released state to a locked state results in a period when both the dog clutch 8c and the friction clutch 9c cannot transmit power, and during this period the automatic transmission is in a neutral state (neutral position).

If the engine is stopped and the motor-generator MG1 is not producing any torque, the temporary neutral state of the automatic transmission not only temporarily reduces the driving torque to the wheels 14 to zero giving the passenger a feeling of deceleration, but also causes a temporary increase in the input rotation speed in the automatic transmission (the rotation speed of the motor-generator MG2). Then, when the friction clutch 9c switches to the locked state, the input rotation speed of the automatic transmission (the rotation speed of the motor-generator MG2) is reduced to match the post-shift rotation speed determined by the vehicle speed and the gear ratio of the high speed transmission system (gears 9a, 9b) resulting in a change in input rotations that leads to the generation of shift shock, and thus brings about reduced shift quality.

In the present embodiment, even when switching the dog clutch 8c from the engaged state to the disengaged state, and switching the friction clutch 9c from the released state to the locked state in order to shift, by performing shift control as described below so that the automatic transmission is not temporarily in the neutral state, the above mentioned problem may be resolved and the shift quality improved.

First, the shift control system for solving the above problem will be described based on FIG. 1. The shift control system is provided with a controller 21 that performs the shift switch control during the switch from the engaged state to the disengaged state in the dog clutch 8c (coupling sleeve 8f), and that performs hydraulic actuation control during the switch from the released state to the locked state in the friction clutch 9c (clutch piston 9f).

The controller 21 receives an input of signals from a sensor group 22 that detects the shift control information needed for basic shift control such as the vehicle speed VSP or the accelerator position APO, and an input of signals from a transmission torque sensor 23 (transmission torque detection means) which detects the transmission torque Tdc of the dog clutch 8c and is necessary for realizing the aspects of the present embodiment.

Figure 2:
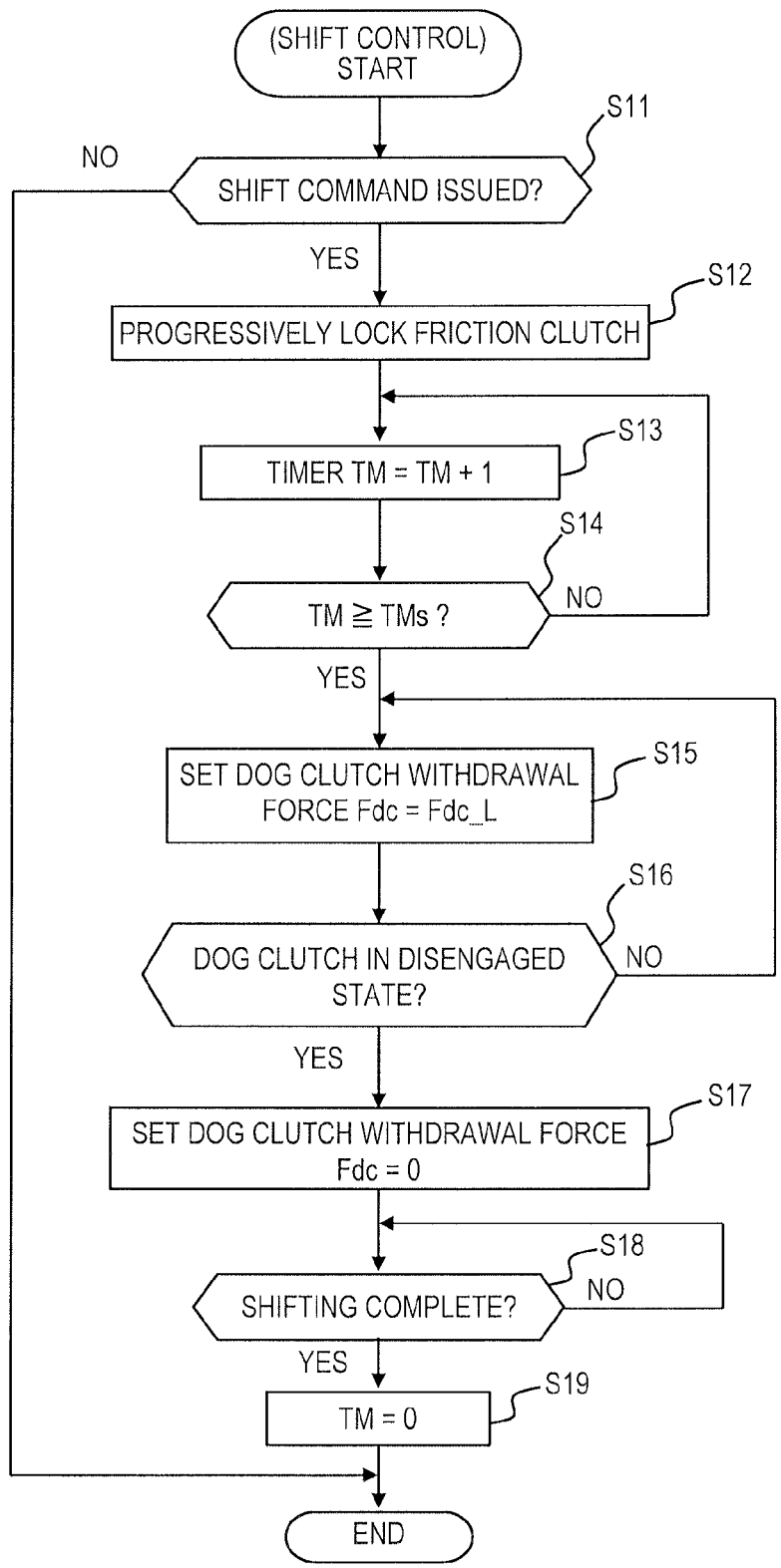
FIG. 2 is a flowchart illustrating the shift control program executed by the controller in FIG. 1.
Figure 3:
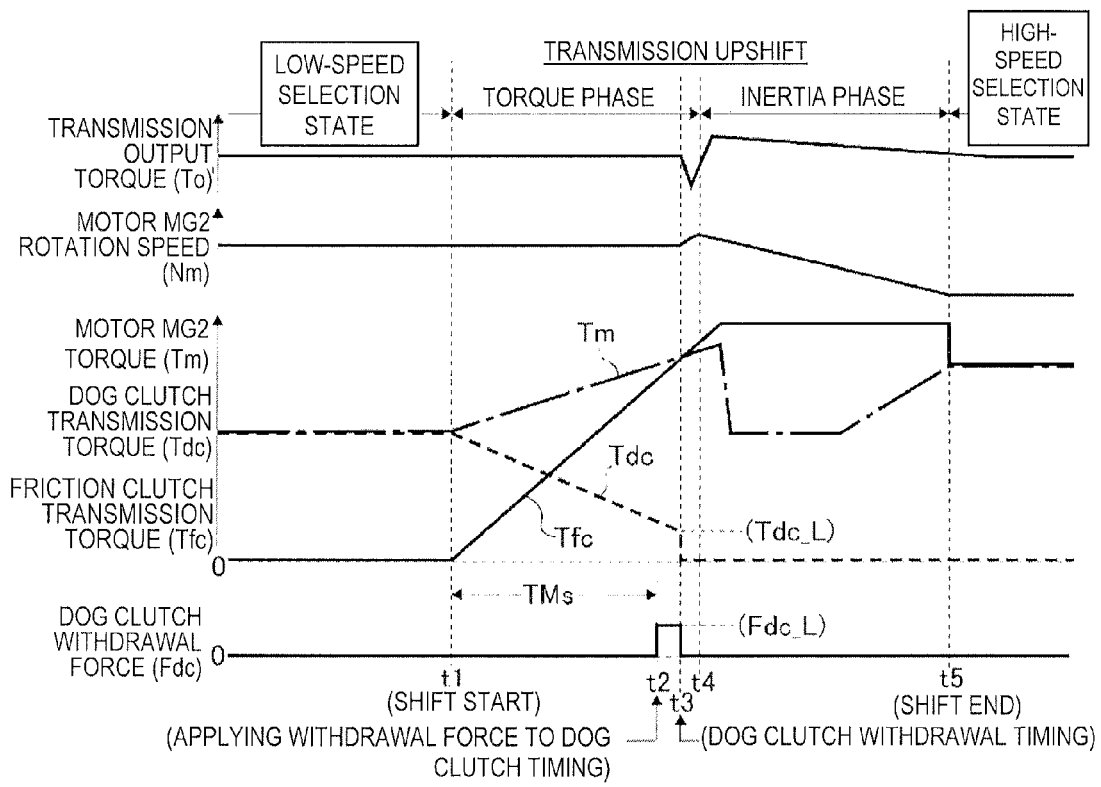
FIG. 3 is an operation time chart illustrating the shift control performed in accordance with the shift control program in FIG. 2.

The controller 21 executes the control program in FIG. 2 based on the input information and executes the above mentioned upshift as shown in FIG. 3.

In step S11, it is confirmed whether or not the system is at the shift start instant t1 in FIG. 3 in accordance with whether or not the above mentioned upshift (shift) command was issued. If no shift command was issued, then the control flow is just before the shift start instant t1 in FIG. 3, and the control ends without change because there is no need to execute the control program in FIG. 2.

When it is determined at step S11 that a shift command was issued (the system has reached shift start instant t1 in FIG. 3), first, in step S12 progressive locking is started in the friction clutch 9c which is in the released state, and the progressive locking continues until the friction clutch 9c is completely locked. As illustrated in FIG. 3 the transmission torque Tfc of the friction clutch 9c starts at zero at the shift start time t1 and gradually increases along a predetermined gradient to the maximum value. Therefore step S12 corresponds to a means for prioritizing the switching of the friction shift element in the present invention.

In the next step S13, a timer TM is incremented (stepped) in order to measure the amount of time that passes after the shift start instant t1 (the start time for progressive locking of the friction clutch 9c).

In step S14, it is confirmed whether or not the time TM is indicating no less than a set time TMs. That is, the controller confirms whether or not the set time TMs has passed since the shift start instant t1 (the start time for progressive locking of the friction clutch 9c).

Here the above mentioned set time TMs will be explained. When the progressive locking of the friction clutch 9c gradually increases the friction clutch transmission torque Tfc, the transmission torque Tdc for the dog clutch 8c is a value resulting from the motor torque Tm of the motor-generator MG2 which is the input torque for the transmission minus the friction clutch transmission torque Tfc. Therefore as shown in FIG. 3 the dog clutch transmission torque Tdc gradually decreases from the maximum value at the shift start time t1 along a predetermined gradient.

Figure 4:
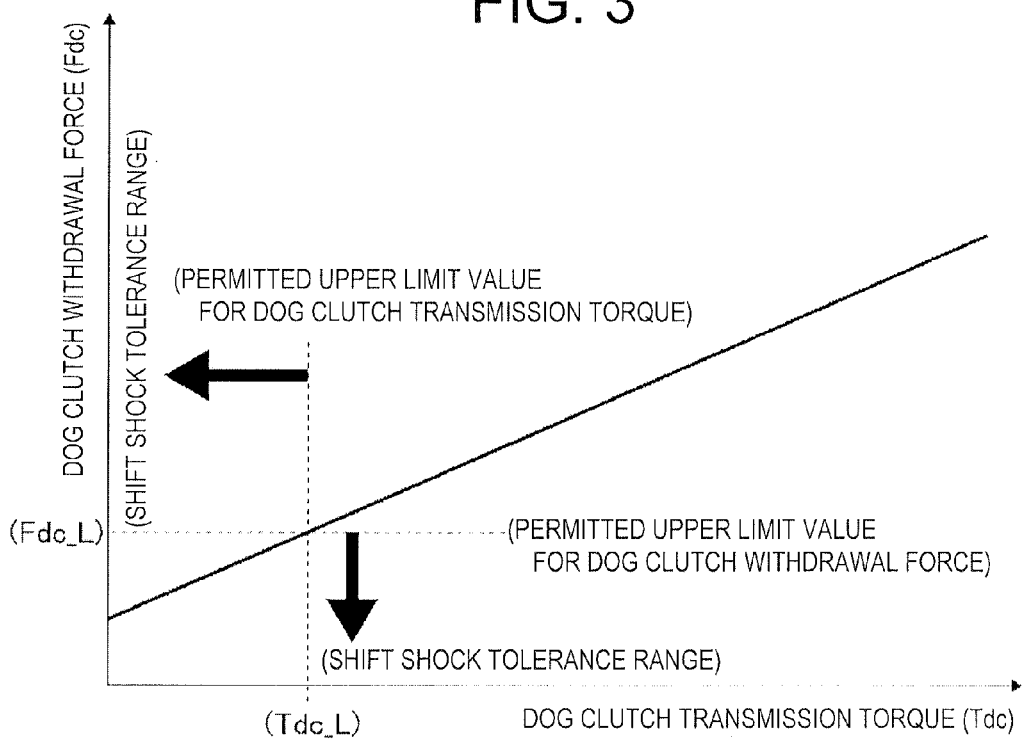
FIG. 4 is a characteristic line diagram illustrating the relationship between the transmission torque for the dog clutch in FIG. 1 and the withdrawal force required for switching the dog clutch from the engaged state to the disengaged state.

On the one hand, the dog clutch withdrawal force Fdc required in order to actuate the shift of the dog clutch 8c from the engaged state to the disengaged state during the above mentioned shifting changes in response to the dog clutch transmission torque Tdc as exemplified in FIG. 4; the larger the dog clutch transmission torque Tdc the larger the required dog clutch withdrawal force Fdc.

Meanwhile, the shift shock generated due to the actuation of the shift of the dog clutch 8c from the engaged state to the disengaged state becomes larger when the dog clutch transmission torque Tdc (consequently the dog clutch withdrawal force Fdc) is large. In order to keep the shift shock within a tolerance level, it is necessary to keep the dog clutch transmission torque Tdc (dog clutch withdrawal force Fdc) at or below the permitted upper limit value Tdc_L (Fdc_L) for shift shock exemplified in FIG. 4.

Therefore, when determining the set time TMs in step S14, the set time TMs is defined as the time needed less a given proportional margin for the dog clutch transmission torque Tdc (dog clutch withdrawal force Fdc) which is gradually decreasing from the shift start time t1 along a predetermined gradient as shown in FIG. 3 to fall to the permitted upper limit value Tdc_L (Fdc_L) for shift shock exemplified in FIG. 4.

In step S14 where TM≥TMs is determined in FIG. 3, when the timer TM is before the instant t2, the control returns to step S13 in standby while continuing the clock count using the timer TM. In step S14 where TM≥TMs is determined in FIG. 3, when the timer has advanced past the instant t2, the control proceeds to step S15 where the dog clutch withdrawal force Fdc is changed from zero to the permitted upper limit value Fdc_L (or less).

In this manner, if it is ensured that a withdrawal force Fdc equal to the permitted upper limit value or less is applied to the dog clutch 8c beforehand, the dog clutch transmission torque Tdc which continues to decrease even after the instant t2 (refer to FIG. 3) decreases to a torque value that corresponds to the dog clutch withdrawal force Fdc (≤FdC_L) at the instant t3 which is the time that the dog clutch 8c automatically switches from the engaged state to the disengaged state due to the withdrawal force Fdc (≤FdC_L). Therefore step S15 corresponds to the interference-shift-element switchover means in the present invention.

In step S16, the control program confirms whether or not the dog clutch 8c is in the disengaged state due to the state change in the dog clutch 8c. During the time the dog clutch 8c is not yet in the disengaged state, the control returns to the step S15 and is on standby. At the instant t3 in FIG. 3 when the dog clutch 8c is in the disengaged state, the control proceeds to step S17 and the dog clutch withdrawal force Fdc is set to zero.

In the next step S18, the control confirms whether or not shifting is in an inertia phase which is at instant t5 when shifting ends. The inertia phase occurs after the instant t4 (FIG. 3) when a torque phase terminates. The torque phase includes the progressive locking of the friction clutch 9c during step S12, and the switch to the disengaged state in the dog clutch 8c during step S15 and step S16.

When it is determined that the control has not yet reached the shift end instant t5, the control returns to the instant just before and proceeds to the inertia phase after the instant t4. When it is determined that the inertia phase is complete and the control has reached the shift end instant t5, the timer TM used in step S13 is reset to zero in preparation for the next shift control.

The shift control in the first embodiment illustrated in the above mentioned FIGS. 2 and 3 performs as follows.

On switching the dog clutch 8c from the engaged state to the disengaged state, and switching the friction clutch 9c from the released state to the locked state in order to shift, the shift control: causes progressive switching of the friction clutch 9c to the locked state (step S12) prior to the switch of the dog clutch 8c to the disengaged state; and while progressively switching the friction clutch 9c to the locked state, in order for the dog clutch 8c to automatically switch from the engaged state to the disengaged state, the withdrawal force Fdc=Fdc_L is applied to the dog clutch 8c beforehand (step S15) when, as shown in FIG. 3, the decreasing transmission torque Tdc of the dog clutch 8c arrives at a predetermined value Tdc_L (t3).

That is, there is no time when both the dog clutch 8c and the friction clutch 9c cannot transmit power; therefore, while shifting, the automatic transmission does not enter a neutral state where power transmission impossible. Accordingly, while shifting there is no instance when the drive torque becomes zero, and there is no feeling of deceleration.

For the same reason, the input rotation speed to the automatic transmission (rotation speed of the motor Nm) does not temporarily increase, and it is possible to avoid the shift shock that would be caused by the change in input rotations.

Hereby, according to the present embodiment, it is possible to greatly improve the shift quality when shifting by switching the dog clutch 8c from the engaged state to the disengaged state, and switching the friction clutch 9c from the released state to the locked state.

Furthermore, in the present embodiment, the withdrawal force Fdc applied to the dog clutch 8c beforehand in the step S15 is defined to be under a permitted upper limit value Fdc_L within which the size of the shift shock that accompanies the switch from the engaged state to the disengaged state in the dog clutch 8c is in a tolerable range. Therefore, it is possible to achieve the above mentioned effects where without the shift shock that accompanies the switch from the engaged state to the disengaged state in the dog clutch 8c exceeding the tolerable range and creating a problem.

Moreover, applying a withdrawal force Fdc=Fdc_L to the dog clutch 8c beforehand in step S15 thereby obtains the aforementioned effects; therefore while progressively switching to the locked state in the friction clutch 9c, when, as shown in FIG. 3, the decreasing transmission torque Tdc of the dog clutch 8c arrives at a predetermined value Tdc_L (t3), the dog clutch 8c automatically switches from the engaged state to the disengaged state. The switch to the relevant state in the dog clutch 8c takes place without any particular kind of control, and may be made to happen inexpensively and accurately.

Furthermore, the timing for starting application of the withdrawal force Fdc=Fdc_L to the dog clutch 8c beforehand may be defined as the instant t2 which is the set time TMs after the shift start instant t1 (the time for the start of progressive switching to the locked state in the friction clutch 9c). The set time TMs is defined so that the instant t2 is the moment before instant t3 which is when the transmission torque Tdc of the dog clutch 8c becomes the permitted upper limit value Tdc_L for the shift shock. Therefore, it is possible to prevent the pointless wasting of energy resulting from needlessly applying the withdrawal force Fdc=Fdc_L during the instants t1-t2, while achieving the aforementioned effects.

Embodiment 2

Figure 5:
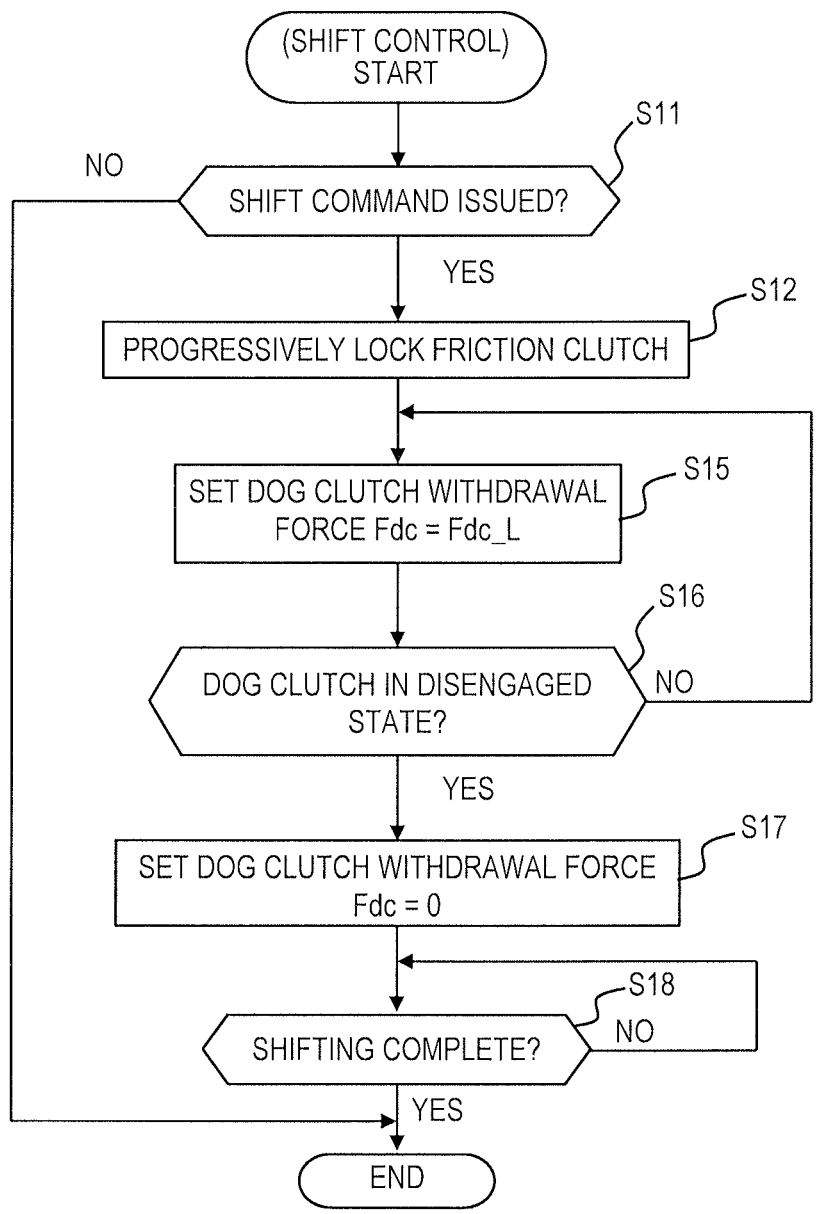
FIG. 5 is a flowchart similar to FIG. 2, illustrating the shift control program for the shift control device according the second embodiment of the present invention.

FIG. 5 illustrates the shift control program for the shift control device according the second embodiment of the present invention. In the present embodiment, the shift control system is similar to the system in FIG. 1; the controller 21 executes the shift control program in FIG. 5 and, instead of FIG. 3 executes the shift control coinciding with the operation time chart in FIG. 6.

Steps S13, S14, and S19 in the shift control program in FIG. 2 are removed from the shift control program in FIG. 5. Other steps which coincide with the same processes in FIG. 2 are given the same reference numerals. For simplicity, a repeated explanation thereof will be avoided.

Figure 6:
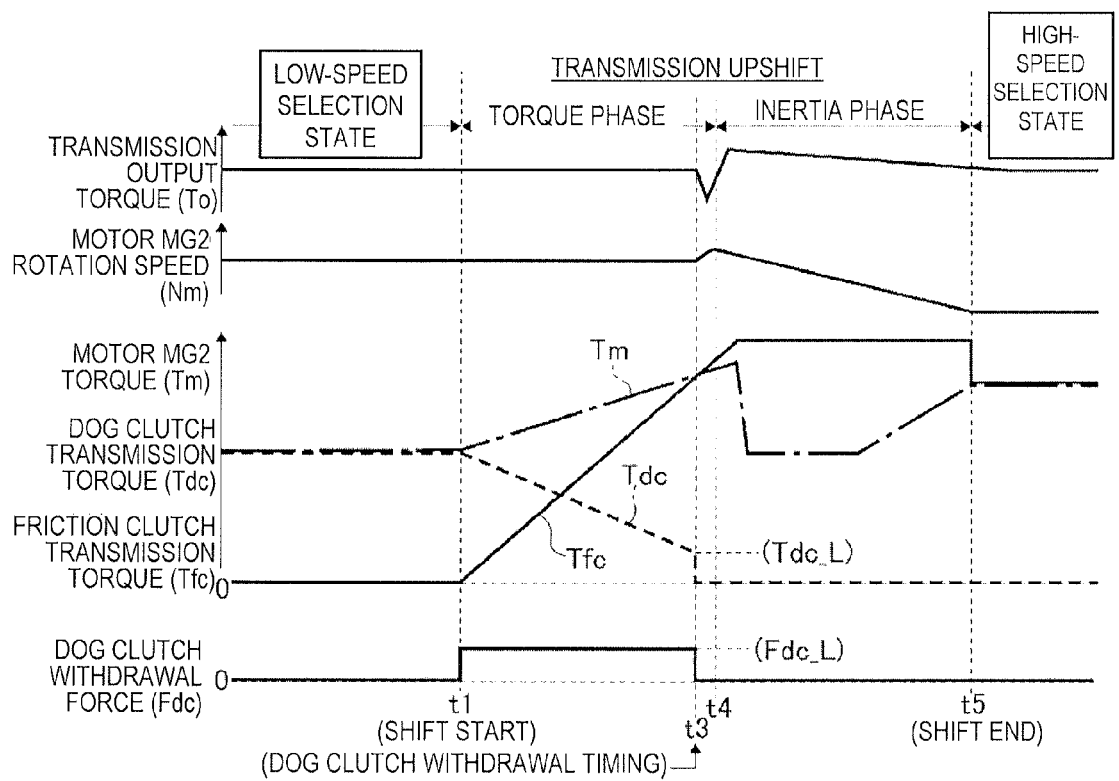
FIG. 6 is an operation time chart illustrating the shift control performed in accordance with the shift control program in FIG. 5.

As shown in FIG. 6, in the shift control of the present invention according to the control program in FIG. 5, after the shift start instant t1 (the time for the start of progressive switching to the locked state in the friction clutch 9c), the withdrawal force Fdc=Fdc_L is applied to the dog clutch (step S15) beforehand. In this manner, in this case as well and similarly to the first embodiment, applying the withdrawal force Fdc=Fdc_L to the dog clutch 8c beforehand causes the switch from the engaged state to the disengaged state to take place automatically in the dog clutch 8c at the instant t3 when the transmission torque Tdc of the dog clutch 8c is Tdc=Tdc_L.

According to the shift control in the second embodiment, the same manner of effects as the first embodiment are achieved and not only that, the additional advantage is that time management using the aforementioned timer TM, and determining the set time TM are no longer necessary.

Embodiment 3

Figure 7:
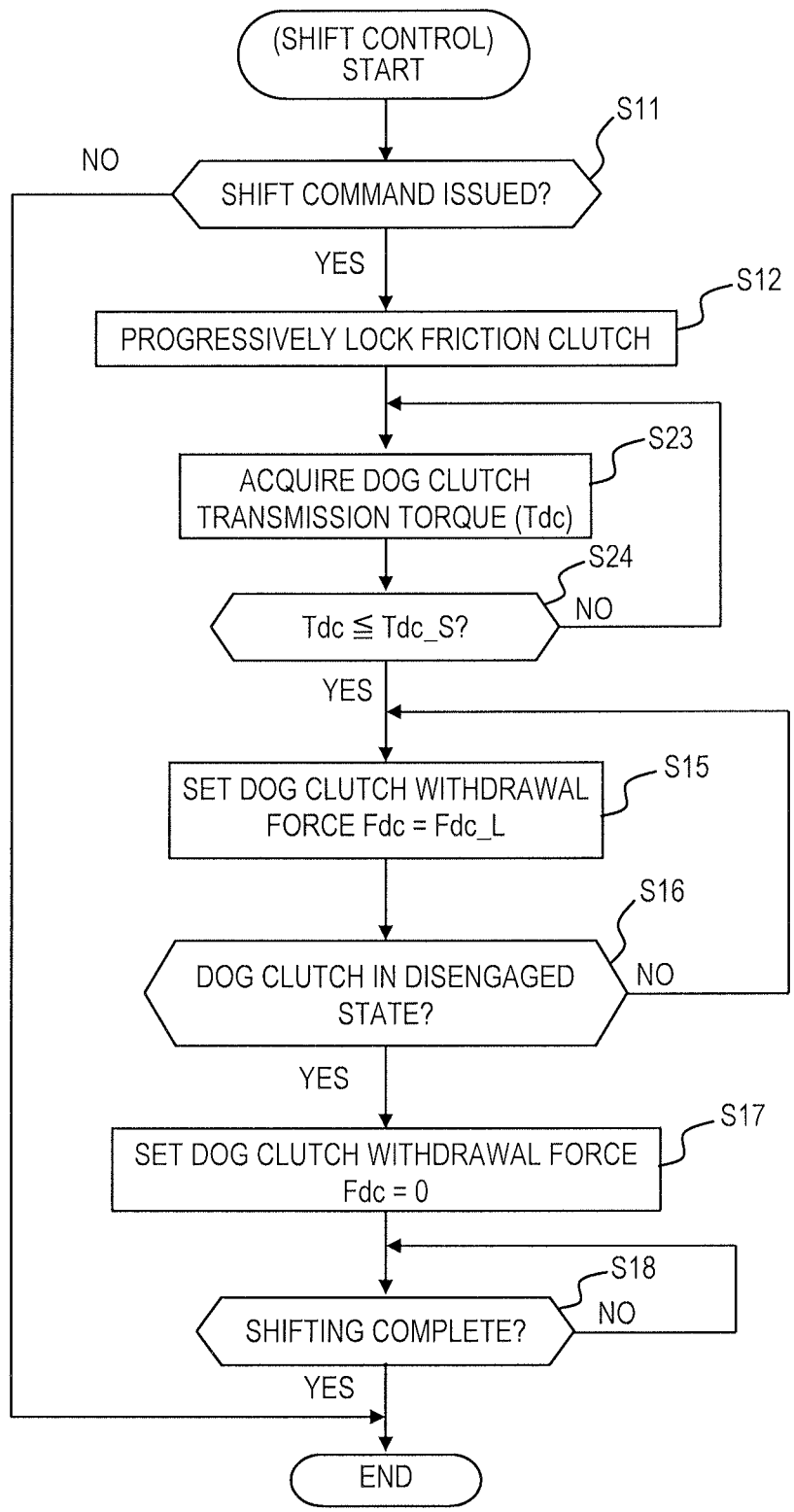
FIG. 7 is a flowchart similar to FIG. 2, illustrating the shift control program for the shift control device according the third embodiment of the present invention.

FIG. 7 illustrates the shift control program for the shift control device according the third embodiment of the present invention. In the present embodiment, the shift control system is similar to the system in FIG. 1; the controller 21 executes the shift control program in FIG. 7 and, instead of FIG. 3 executes the shift control coinciding with the operation time chart in FIG. 8.

Step S13 and step S14 in the shift control program in FIG. 2 are replaced by step S23 and step S24 respectively in the shift control program in FIG. 7, while step S19 from the shift control program in FIG. 2 is removed from the shift control program in FIG. 7. Other steps which coincide with the same processes in FIG. 2 are given the same reference numerals. For simplicity, a repeated explanation thereof will be avoided.

Figure 8:
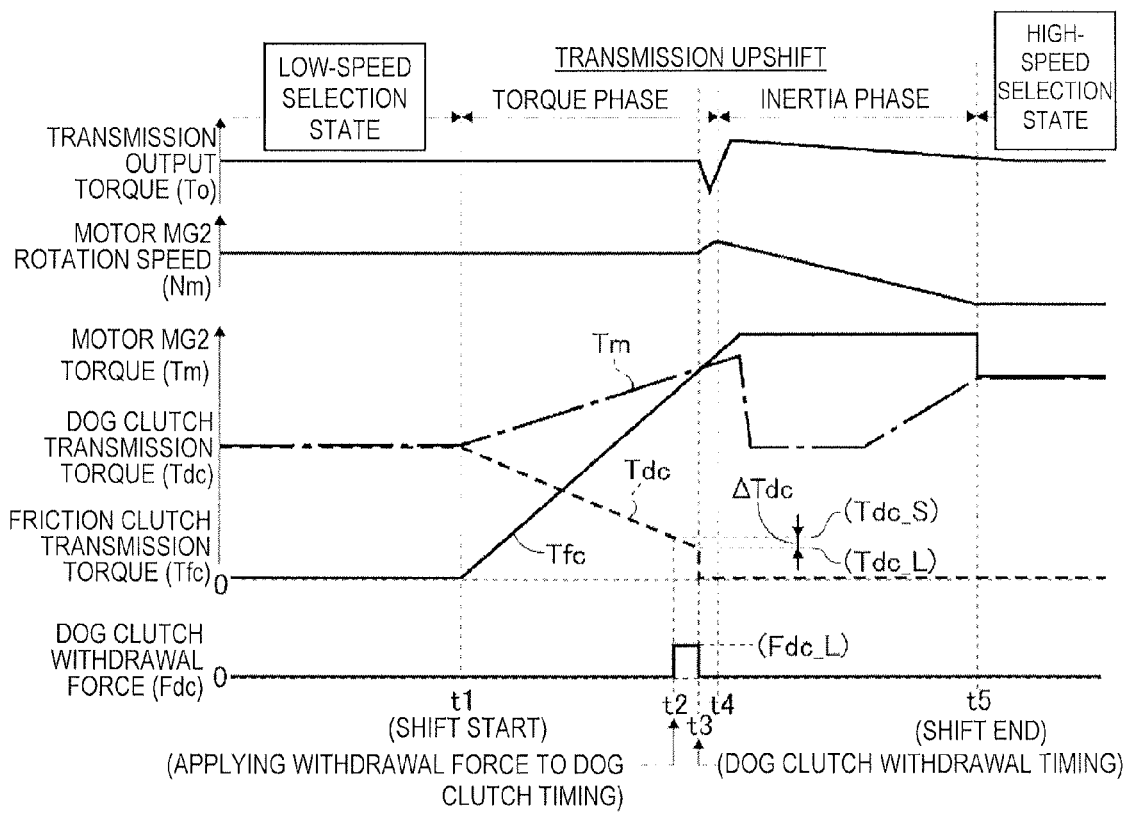
FIG. 8 is an operation time chart illustrating the shift control performed in accordance with the shift control program in FIG. 7.

After starting to gradually increase the friction clutch transmission torque Tfc by progressively locking the friction clutch 9c in step S12, the transmission torque Tdc of the dog clutch Tdc is decreasing as shown in FIG. 8 as the friction clutch transmission torque Tfc gradually increases, and in the selected step S23, the transmission torque Tdc is fully acquired. In the next step S24, it is confirmed whether or not dog clutch transmission torque Tdc is less than or equal to a set value Tdc_S.

Here, as shown in FIG. 8, in relation to the dog clutch transmission torque Tdc the above mentioned set value Tdc_S is defined as a value (Tdc_S=Tdc_L+ΔTdc) which is larger than the predetermined value for the dog clutch transmission torque Tdc (in FIG. 8, the same as FIG. 3 which is the permitted upper limit value Tdc_L for the shift shock) by the amount of a given proportional margin ΔTdc.

At step S24, during the time prior to instant t2 in FIG. 8 when it is determined that the dog clutch transmission torque Tdc is less than the set value Tdc_S, the control returns to step S23, and acquires more of the dog clutch transmission torque Tdc while in standby. At step S24 at the instant t2 in FIG. 8 when it is determined that Tdc≤Tdc_S, the control proceeds to step S15 where the dog clutch withdrawal force Fdc is changed from zero to the permitted upper limit value Fdc_L (or less).

In this manner, if it is ensured that a withdrawal force Fdc less than or equal to the permitted upper limit value Fdc_L is applied to the dog clutch 8c beforehand, the dog clutch transmission torque Tdc which continues to decrease even after the instant t2 (refer to FIG. 8) decreases to a torque value that corresponds to the dog clutch withdrawal force Fdc (≤FdC_L) at the instant t3 in FIG. 8 which is the time that the dog clutch 8c automatically switches from the engaged state to the disengaged state due to the withdrawal force Fdc (≤FdC_L). Further at the instant t3 in FIG. 8 when switching the state in the dog clutch 8c is complete (step S16) the dog clutch withdrawal force Fdc is set to zero (step S17).

According to the shift control in the third embodiment, as illustrated with the operation timing chart therefor in FIG. 8, the operation timing chart is the same as the operation timing chart shown in FIG. 1. The present embodiment achieves the same manner of effects as the first embodiment. Not only that, the instant t2 in FIG. 8 when the withdrawal force Fdc less than or equal to the permitted upper limit value Fdc_L would start to be applied to the dog clutch 8c is determined based on the dog clutch transmission torque detected value Tdc detected by the sensor 23; therefore, even if the instant t3 in FIG. 8 when the switching of states for the dog clutch 8c varies because of individual differences or chronological changes, it is possible to ensure that the instant at which the withdrawal force less than or equal to the permitted upper limit value Fdc_L would start to be applied to the dog clutch is reliably before the instant t3 at a prearranged timing t2, which is a further obvious improvement over the aforementioned effects.

Other Embodiments

In all of the above mentioned first through third embodiments, as shown in FIGS. 3, 6, and 8, the withdrawal force Fdc_L is applied to the dog clutch 8c beforehand, that is before the instant t3 when the dog clutch transmission torque Tdc decreases to the permitted upper limit value Tdc_L, so that the dog clutch 8c can automatically switch from the engaged state to the disengaged state when the dog clutch transmission torque Tdc decreases to the permitted upper limit value Tdc_L. However, it is possible set the timing to the instant t3 when the dog clutch transmission torque Tdc drops to the permitted upper limit value Tdc_L and apply the withdrawal force Fdc_L to the dog clutch 8c to switch the dog clutch 8c from the chewed stated to the disengaged state.

If this idea is adopted in the first embodiment, the set time TMs in step S14 in FIG. 2 may be made to correspond with a time determined by experiment and so forth that is between t1-t3. If this idea is adopted in the third embodiment, the dog clutch transmission torque set value Tdc_S can be set as Tdc_S=Tdc_L. If modified in this manner, the timing at which the withdrawal force Fdc_L is applied to the dog clutch 8c becomes the timing for switching the dog clutch 8c from the engaged state to the disengaged state and thereby avoids needless consumption of energy because there is no need to apply the withdrawal force Fdc_L to the dog clutch 8c beforehand.

The invention claimed is:

1. An automatic transmission shift control device comprising:
   a controller programmed to shift an automatic transmission by issuing a command for switching an interference shift element from an engaged state to a disengaged state, and by issuing a command for switching a friction shift element from a released state to a locked state, the automatic transmission having a first transmission unit and a second transmission unit different from the first transmission unit, the first transmission unit being selected by switching the interference shift element to the engaged state and the friction shift element to the released state, and the second transmission unit being selected by switching the interference shift element to the disengaged state and the friction shift element to the locked state,
   the controller being programmed to include
      a progressive friction-shift-element switchover section which causes progressive switching of the friction shift element from the released state to the locked state prior to the command for switching of the interference shift element from the engaged state to the disengaged state; and
      an interference-shift-element switchover section which causes the switching of the interference shift element from the engaged state to the disengaged state when transmission torque of the interference shift element decreases to a predetermined value as the progressive friction-shift-element switchover section causes progressive switching of the friction shift element from the released state to the locked state.

2. The automatic transmission shift control device according to claim 1, wherein
   the predetermined value related to the transmission torque for the interference shift element is a transmission torque permitted upper value for the interference shift element which is a tolerable level for a shift shock generated in association with the switching of the interference shift element from the engaged state to the disengaged state.

3. The automatic transmission shift control device according to claim 2, wherein
   the interference-shift-element switchover section is provided with a transmission torque detection section that detects the transmission torque for the interference shift element which decreases as the progressive friction-shift-element switchover section started to progressively switch the friction shift element from the released state to the locked state; and
   the interference-shift-element switchover section issues a command to apply the switchover force to the interference shift element from a time the transmission torque of the interference shift element detected by the transmission torque detection section decreases to a set value which is the adding of a given proportional margin to the predetermined value.

4. The automatic transmission shift control device according to claim 2, wherein
   the interference-shift-element switchover section commands the switching of the interference shift element from the engaged state to the disengaged state when the transmission torque of the interference shift element decreases to the predetermined value based on a time elapsed since the progressive friction-shift-element switchover section started to progressively switch the friction shift element from the released state to the locked state.

5. The automatic transmission shift control device according to claim 4, wherein
   the interference-shift-element switchover section switches the interference shift element from the engaged state to the disengaged state when a predetermined time has passed from the time the progressive friction-shift-element switchover section started to progressively switch the friction shift element from the released state to the locked state.

6. The automatic transmission shift control device according to claim 5, wherein
   the interference-shift-element switchover section issues a command to apply the switchover force to the interference shift element beforehand from a given time during a period from the start of shifting until the transmission torque of the interference shift element decreases to the predetermined value.

7. The automatic transmission shift control device according to claim 6, wherein
   the interference-shift-element switchover section issues a command to apply the switchover force to the interference shift element beforehand from the time a preset time has elapsed since the progressive friction-shift-element switchover section started to progressively switch the friction shift element from the released state to the locked state.

8. The automatic transmission shift control device according to claim 4, wherein
   the interference-shift-element switchover section issues a command to apply a switchover force to the interference shift element beforehand that causes the interference shift element to automatically switch from the engaged state to the disengaged state when the transmission torque of the interference shift element which is decreasing as the progressive friction-shift-element switchover section progressively switches the friction shift element from the released state to the locked state decreases to the predetermined value.

9. The automatic transmission shift control device according to claim 1, wherein
   the interference-shift-element switchover section commands the switching of the interference shift element from the engaged state to the disengaged state when the transmission torque of the interference shift element decreases to the predetermined value based on a time elapsed since the progressive friction-shift-element switchover section started to progressively switch the friction shift element from the released state to the locked state.

10. The automatic transmission shift control device according to claim 9, wherein the interference-shift-element switchover section switches the interference shift element from the engaged state to the disengaged state when a predetermined time has passed from the time the progressive friction-shift-element switchover section started to progressively switch the friction shift element from the released state to the locked state.

11. The automatic transmission shift control device according to claim 10, wherein the interference-shift-element switchover section issues a command to apply the switchover force to the interference shift element beforehand from a given time during a period from the start of shifting until the transmission torque of the interference shift element decreases to the predetermined value.

12. The automatic transmission shift control device according to claim 11, wherein the interference-shift-element switchover section issues a command to apply the switchover force to the interference shift element beforehand from the time a preset time has elapsed since the progressive friction-shift-element switchover section started to progressively switch the friction shift element from the released state to the locked state.

13. The automatic transmission shift control device according to claim 9, wherein the interference-shift-element switchover section issues a command to apply a switchover force to the interference shift element beforehand that causes the interference shift element to automatically switch from the engaged state to the disengaged state when the transmission torque of the interference shift element which is decreasing as the progressive friction-shift-element switchover section progressively switches the friction shift element from the released state to the locked state decreases to the predetermined value.

14. The automatic transmission shift control device according to claim 1, wherein the interference-shift-element switchover section is provided with a transmission torque detection section that detects the transmission torque for the interference shift element which decreases as the progressive friction-shift-element switchover section started to progressively switch the friction shift element from the released state to the locked state; and the interference-shift-element switchover section issues a command to apply the switchover force to the interference shift element from a time the transmission torque of the interference shift element detected by the transmission torque detection section decreases to a set value which is the adding of a given proportional margin to the predetermined value.

15. The automatic transmission shift control device according to claim 1, wherein the first transmission unit is a low side transmission unit for selecting a low side transmission path, the second transmission unit is a high side transmission unit for selecting a high side transmission path.

\* \* \* \* \*